United States Patent [19]
Wilson

[11] Patent Number: 5,646,784
[45] Date of Patent: Jul. 8, 1997

[54] HELMET DISPLAY SYSTEM

[75] Inventor: Gerald Hugh Wilson, Edinburgh, United Kingdom

[73] Assignee: GEC Marconi Limited, Middlesex, England

[21] Appl. No.: 249,128

[22] Filed: May 25, 1994

[30]     Foreign Application Priority Data

Jun. 4, 1993 [GB] United Kingdom ............. 9311528

[51] Int. Cl.$^6$ .................................................. G02B 27/14
[52] U.S. Cl. ............................................ 359/632; 359/14
[58] Field of Search ........................ 359/632, 13, 14; 2/425, 431, 432

[56]               References Cited

U.S. PATENT DOCUMENTS

| | | | |
|---|---|---|---|
| 4,722,101 | 2/1988 | Blower | 2/422 |
| 5,113,535 | 5/1992 | Hedges et al. | 2/425 |
| 5,138,555 | 8/1992 | Albrecht | 364/424.06 |
| 5,309,169 | 5/1994 | Lippert | 345/8 |
| 5,398,134 | 3/1995 | Ikegaya | 359/885 |

FOREIGN PATENT DOCUMENTS

| | | |
|---|---|---|
| 419199A2 | 3/1991 | European Pat. Off. |
| 2 681 702 | 3/1993 | France. |
| 1115657 | 7/1959 | Germany. |
| 1505873 | 3/1978 | United Kingdom. |
| 2149140 | 6/1985 | United Kingdom. |
| WO90/01717 | 2/1990 | WIPO. |

*Primary Examiner*—Georgia Y. Epps
*Assistant Examiner*—Thomas Robbins
*Attorney, Agent, or Firm*—Donald C. Casey

[57]               ABSTRACT

A helmet display system is provided comprising a display visor 3 located on helmet 1 on which helmet is also positioned image projection means for projecting an image via a holographic combiner 4 on the display visor 3. The helmet further comprises an anti-glare visor 2 which has optical transmission characteristics similar to those of a neutral density visor, with the exception that these characteristics are modified to compensate for the low transmission value of the display visor 3 to frequencies within a narrow waveband to which the combiner 4 is tuned. The invention provides a helmet display system which can be used in conjunction with an aircraft head-up display if required.

7 Claims, 2 Drawing Sheets

HELMET DISPLAY SYSTEM

BACKGROUND OF THE INVENTION

This invention relates to a helmet display system and in particular to a helmet display system for military aircraft, which display system can be used in conjunction with a head-up display (HUD).

It is desirable to present information to military aircrew in a visible form within the direct field of view of the aircrew. Such information may relate to the altitude, speed, etc of the aircraft, information from a radar, or may be a sight by which weapons can be targeted. Such information is conventionally provided by a head-up display which is fixed relative to the aircraft. Because of this, this information may not be in the direct line of sight of a member of the aircrew if that member is looking other than in the straight ahead position. Also, if a target sight is displayed then the aircraft will have to be aligned with the target. More recently, helmet display systems have been developed whereby the desired information is provided on the visor of a helmet. This is achieved by providing a combiner on the visor, which reflects radiation enabling an image projected on the rear surface of the visor to be seen by the wearer of the helmet.

Holographic combiners can be frequency tuned to the selected waveband of a projected image, and give good transmission values at frequencies outside that band, but unfortunately they also reflect radiation in the selected waveband which is received externally of the visor. This is particularly a problem where the helmet display is to be used in conjunction with a conventional head-up display, for the waveband of both the helmet display and head-up display are likely to be the same, normally about 545 nm, as at this wavelength the eye is particularly sensitive. Therefore a large proportion, typically about 80%, of the radiation from the head-up display incident on the combiner is reflected.

According to the present invention there is provided a helmet display system comprising a display visor including a combiner reflective to radiation within a selected relatively narrow waveband of the visible spectrum; means for projecting an image within the selected waveband to an eye of a wearer of the helmet by reflection from the combiner; and an anti-glare visor having high transmission values in a waveband of the visible spectrum substantially corresponding to the selected waveband relative to the transmission values for the remainder of the visible spectrum, the display and anti-glare visor being arranged such that in use the helmet wearer may view a scene through both visors simultaneously.

The present invention arises from the realisation that the head-up display of an aircraft, along with other instrumentation, is designed to be capable of providing a display at a sufficiently high intensity such that it can be viewed with a neutral density (anti-glare) visor deployed, which typically has a transmission value of approximately 16 percent. However, when a holographic combiner is incorporated on a display visor, then this combiner will attenuate the signal within the particular waveband to which it is tuned, and therefore the transmission value of the anti-glare visor within the selected waveband can be increased. This then compensates for attenuation by the combiner, and preferably the sum of the transmission values of the two visors are substantially uniform over the visible spectrum. Therefore by employing the present invention the wearer of the helmet can see both the helmet display and a conventional head-up display, even when the anti-glare visor is deployed. Furthermore the intensity of the head-up display does not need to be adjusted dependent on the position of the anti-glare visor, and the colour cast obtained when using the display visor by itself, or in combination with a conventional neutral density visor (due to the attenuation of the selected waveband by the combiner), is degraded or removed altogether when the visors of the present invention are used in combinations.

The glare visor may advantageously be photochromic.

One embodiment of the present invention will now be described by way of example only with reference to the accompanying drawings of which:

BRIEF DESCRIPTION OF THE DRAWINGS

FIG. 1b is a schematic plan view of the visors and image generating means of the helmet of FIG. 1a; and FIGS. 2a to 2d show transmission values for:

Figure 1A:
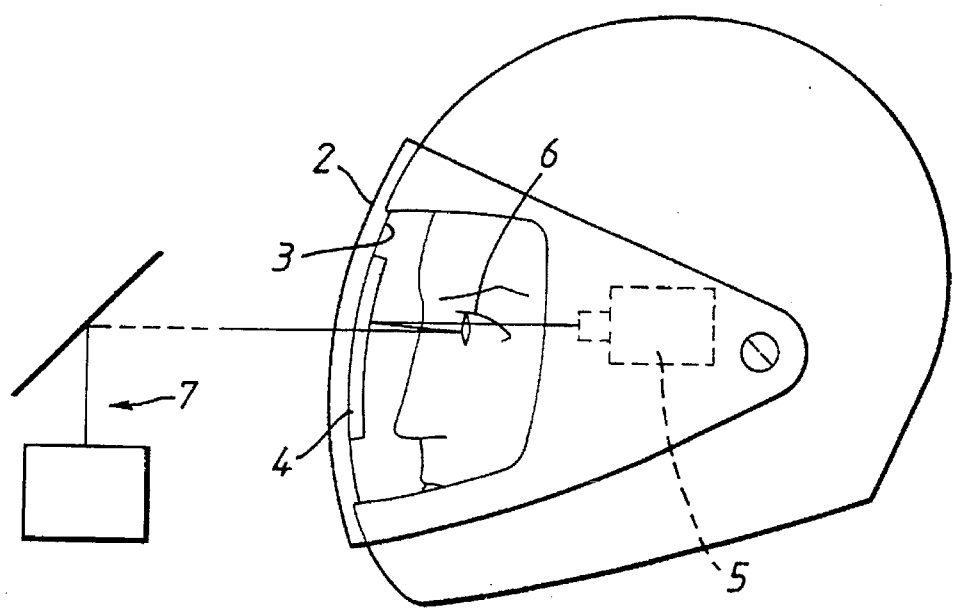
FIG. 1a illustrates a helmet display system in accordance with the present invention.

(a) the combiner of FIG. 1a;

(b) a conventional neutral density visor;

(c) a modified neutral density visor in accordance with the invention; and (d) the combined transmission values for the combiner and modified neutral density visor in accordance with the invention.

DETAILED DESCRIPTION OF ONE PREFERRED EMBODIMENT OF THE INVENTION

Figure 1B:
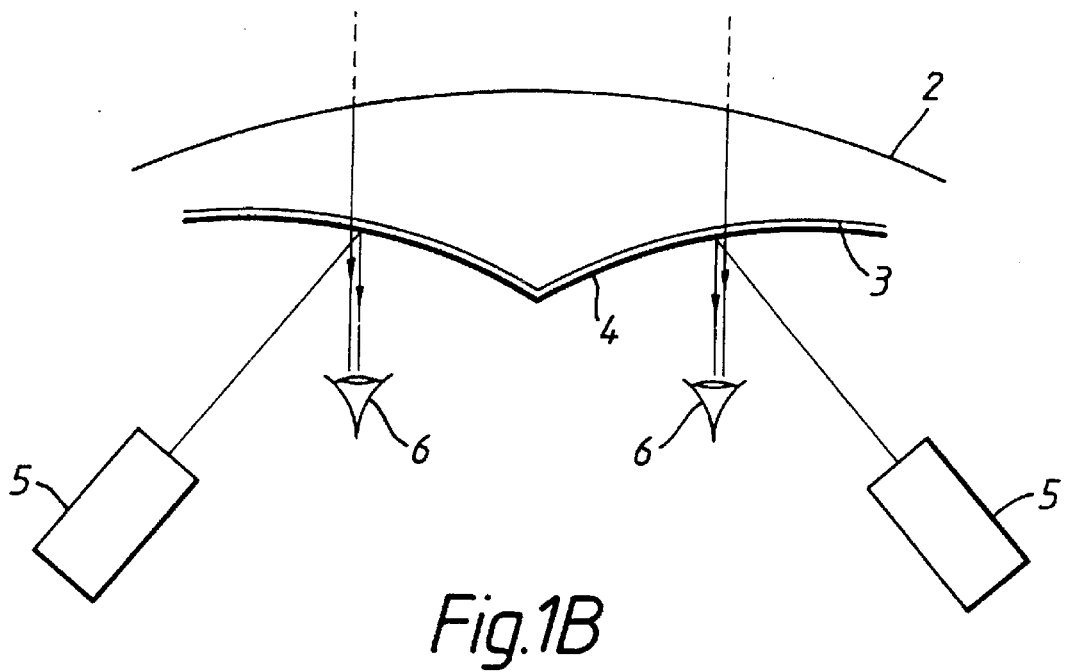
Figure 2A:
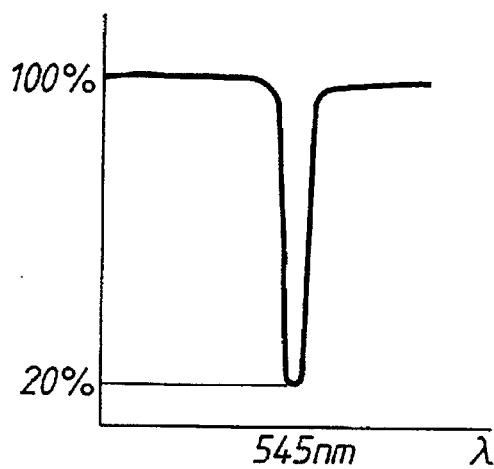
Figure 2B:
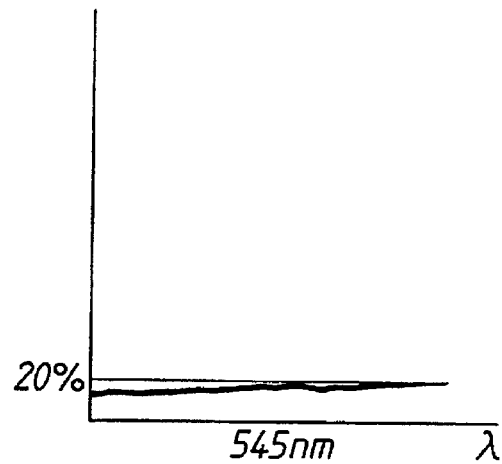
Figure 2C:
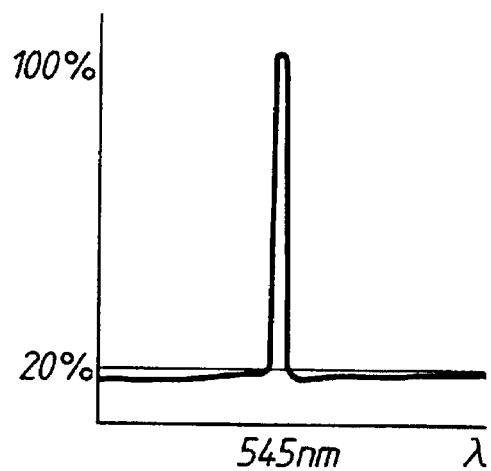

Referring to FIGS. 1a and 1b, a helmet display system comprises; a helmet 1 to which is attached an anti-glare visor 2 the transmission values of which are illustrated in FIG. 2c; a display visor 3 having holographic combiners 4 formed therein; and two image projection means 5 which each comprise a cathode ray tube and relay optics. The image projection means 5 could alternatively comprise relay optics and the termination of an optical fibre cable connected to an image generating means remote from the helmet.

As can be seen from FIG. 1b, the holographic combiners 4 reflect radiation from the image projection means 5 to the eyes of the wearer of the helmet 6. The properties of the combiner are selected such that approximately 80 percent of the received radiation which has a wavelength of 545 nm is reflected, and correspondingly only 20 percent of the radiation received from head-up display 7 of the same wavelength is transmitted through the visor.

The transmission properties of the anti-glare visor 2 are illustrated in FIG. 2c and are similar to the transmission characteristics of a conventional anti-glare visor with the exception that the transmission value is high for a narrow waveband centred on 545 nm.

Figure 2D:
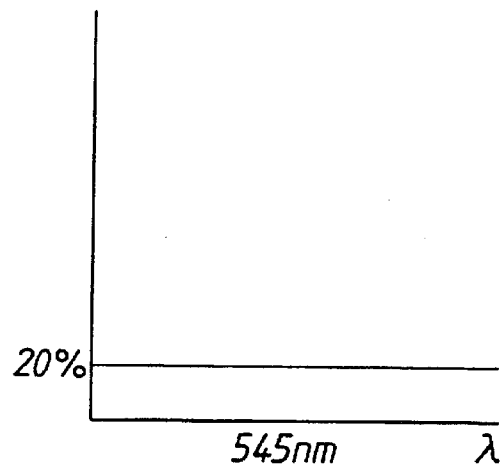

The sum transmission characteristics of the two visors is illustrated in FIG. 2d and these are similar to those of the conventional neutral density visor which are illustrated in FIG. 2b. The anti-glare visor can be photochromic.

What I claim is:

1. A helmet display system comprising:

a display visor carried by said helmet and including a combiner reflective to radiation within a predetermined waveband of the visible spectrum; means carried by said helmet for projecting an image within the predetermined waveband to an eye of a wearer of the helmet by reflection from the combiner;

and an anti-glare visor carried by said helmet and being transmissive to light in said predetermined waveband of the visible spectrum and comparatively less transmissive to light in the visible spectrum outside of said predetermined waveband, the display visor and anti-glare visor being arranged such that in use the helmet wearer may view a scene through both visors simultaneously.

2. A display system as claimed in claim 1 wherein the combined transmission of the two visors is substantially uniform over the visible spectrum.

3. A display system as claimed in claim 1 comprising a holographic combiner which collimates the image.

4. A display visor as claimed in claim 1 wherein the image is projected by relay optics located on the helmet.

5. A display system as claimed in claim 1 wherein the predetermined band is substantially centred on 545 nm.

6. A display system as claimed in claim 1 for use in a combat aircraft, wherein the anti-glare visor is arranged to be worn over the display visor, and wherein the anti-glare visor is capable of withstanding the blast force experienced on ejection from such an aircraft.

7. A display system as claimed in claim 1 wherein the anti-glare visor is photochromic.

* * * * *